Figure 1:
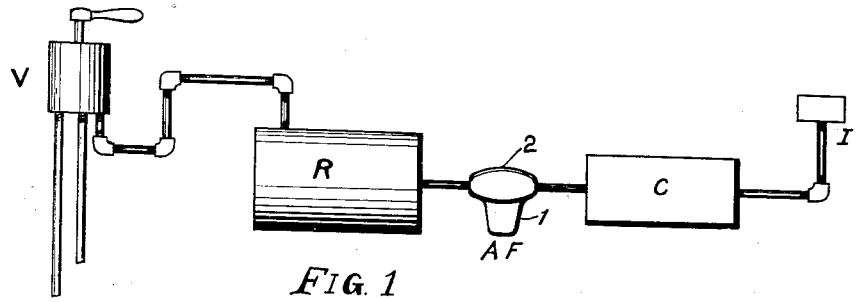

W. W. HUNZICKER.
METHOD AND APPARATUS FOR PREVENTING AND REMOVING OBSTRUCTIONS IN FLUID PRESSURE SYSTEMS.
APPLICATION FILED JUNE 7, 1919.

1,336,905.

Patented Apr. 13, 1920.

Inventor
WALTER H. HUNZICKER.
By
Attorney

UNITED STATES PATENT OFFICE.

WALTER W. HUNZICKER, OF MANSFIELD, OHIO.

METHOD AND APPARATUS FOR PREVENTING AND REMOVING OBSTRUCTIONS IN FLUID-PRESSURE SYSTEMS.

1,336,905.     Specification of Letters Patent.     Patented Apr. 13, 1920.

Application filed June 7, 1919. Serial No. 302,398.

*To all whom it may concern:*

Be it known that I, WALTER W. HUNZICKER, citizen of the United States, residing at Mansfield, in the county of Richland and State of Ohio, have invented certain new and useful Improvements in Methods and Apparatus for Preventing and Removing Obstructions in Fluid-Pressure Systems, of which the following is a specification.

My invention relates to improvements in a method and apparatus for preventing and removing obstructions in fluid pressure systems and it is especially adapted for preventing the freezing of moisture contained in air or gases flowing through pipes and for the removing of obstructions through the clogging of pipes by grease, etc.

My invention is broad in its application in that it can be applied to systems carrying air or various gases and is positive in its action and economical on account of the principle involved.

Some devices for the same purpose as herein described are constructed on the principle of injecting into the air or gas a fluid in the form of a spray or stream, which will lower the freezing point of moisture. Other devices are constructed on the principle of the air or gas flowing over the surface of the anti-freezing mixture and picking up therefrom such portions of the anti-freezing mixture as evaporate or are caused to evaporate by the flowing air and such devices are quite indefinite in their operation as there are many conditions affecting the amount of anti-freezing mixture which is picked up and carried along with the gas or air.

In the device which I describe herein I cause the air or a portion of the air to pass through the anti-freezing mixture and in this way the moisture contained in the air or gas passing through the anti-freezing mixture is charged with the anti-freezing mixture and therefore is positive in its action and quite automatic in that the moisture contained in the air or gas and which passes through the anti-freezing mixture is forced into intimate contact with the same and there is a forced mixture of the two. At the same time the amount of anti-freezing mixture which is taken up is proportional to the amount of moisture in the air which passes through the anti-freezing mixture.

The usual mixture used in devices of this character is alcohol as it is easy to obtain, is quite readily vaporized, mixes readily with water or moisture and on account of this last property it will also absorb some of the moisture from the air passing through the solution, thereby tending to remove from the air a portion of the moisture which is liable to freeze and obstruct the passages in a fluid system. On account of the various purposes for which the liquid is used I will hereinafter refer to it as the "agent."

My invention therefore resides in the method involved and the arrangement and combination of the various parts which are hereinafter described and claimed.

The following is a description of the various figures in the drawings forming a part of this specification.

Figure 1 shows a portion of air system used in connection with air brakes and consists of an air compressor C, an intake cap I, a pressure receiving tank R and an engineer's valve V for controlling the supply of air to the brake cylinder (not shown). These various elements are connected by means of piping as shown. I prefer to introduce my device in a system of this character between the air compressor C and the receiving tank R and have indicated the same as located at AF. I prefer to locate my device at this point because then all of the air which is used in the system will become charged with the agent practically as soon as the air leaves the compressor. At this time the air has a stored up value of heat and this heat in the air tends to more strongly vaporize the agent as the air passes through the same. If any of the agent condenses in the receiver R it is in a position where it can be picked up by the flowing air and carried on through the system.

Figures 2, 4, 5:
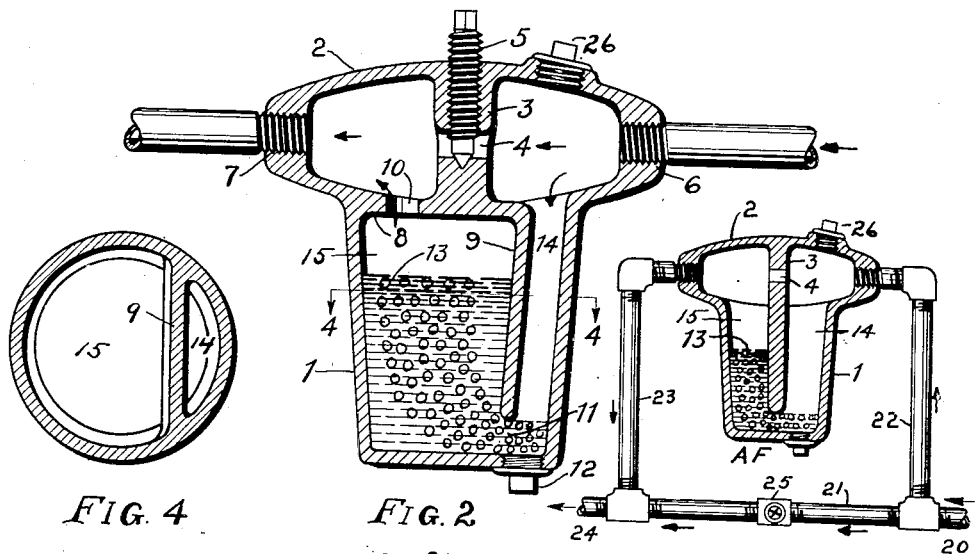

In Fig. 2, I show a vertical sectional view of one form of my device.

Figure 3:
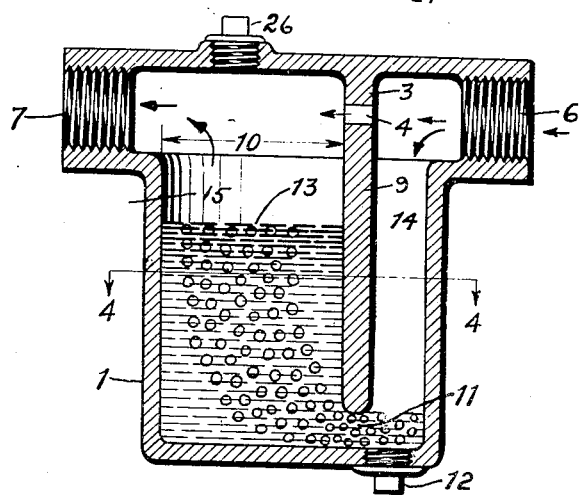

In Fig. 3, I show another form of my device.

In Fig. 4, I show a sectional view of the devices shown in Figs. 2 and 3, on the line 4—4.

In Fig. 5, I show my device as arranged with a system of piping whereby the amount of air forced through the device, indicated as AF, can be regulated and thereby regulate the amount of agent with which the air is charged.

A description of my device and its operation is as follows:—In Fig 2, I have shown a structure comprising two parts, a receptacle 1 and a communicating chamber 2. The communicating chamber is provided with a diaphragm or partition 3 which has an opening 4 therethrough. An adjusting screw 5 is provided whereby the passage through the diaphragm 3 can be varied in order to vary the amount of air which is forced through the agent. The ends of the communicating chamber are provided with openings 6 and 7 by means of which connections are made with the fluid pressure system. There is a diaphragm 8 positioned as shown between the receptacle and the communicating chamber and this diaphragm is provided with an opening 10. Depending from the communicating chamber and into the receptacle is a partition plate 9 which divides the receptacle into two parts with a passage at the lower end of the partition 9 indicated by the numeral 11. Means 12 is provided at the lower end of the receptacle 1 for draining and cleaning the receptacle. The receptacle 1 contains the agent 13 which is usually ethyl or methyl alcohol. When there is no flow of air or gas through the device the level of the agent is the same throughout the receptacle but when there is a flow of air or gas the level of the solution on the two sides of the partition 9 is very liable to change, depending upon conditions.

In Fig. 3 a modified form of my device is shown and the same numerals apply as in the case of Fig. 2. It will be noted however that the diaphragm 3 and partition 9 are one and the same and that there is no screw 5 for adjusting the size of the opening 4 but the screw 5 can be applied to a form shown in Fig. 3 or the plain opening 4 can be used without the adjusting screw 5 in the device shown by Fig. 2. It will also be noted that Fig. 3 is not provided with a diaphragm 8 but this is a detail which can also be applied to the structure shown in Fig. 2.

In Fig. 4 is shown a sectional view of the receptacle 1 and the relation of the two parts of the receptacle, namely 14 and 15 as provided by the partition 9.

In order to introduce into the receptacle the agent for preventing and removing obstructions in the system, I provide a tap 26 through which the agent can be inserted. It will be understood, however that this element can be positioned at other points in the device or it can be of other construction, all of which will be readily understood by one versed in the art.

In Fig. 5 I have shown the device as inserted in a by-pass or as provided with a by-pass and a valve 25 inserted in the by-pass whereby the flow of air through the device can be regulated.

I prefer to place my device when used in a compressed air system near the compressor on the discharge side of the compressor and the air will then be forced into the receiving side of the chamber of my device and will pass through the orifice in the partition dividing the chamber into two parts and into the discharge side of the chamber to the extent dependent upon the size of the orifice in the diaphragm or partition and the balance of the air will pass down through the passageway 14 and thence through the agent and then upward through the communicating opening between the receptacle and the chamber where the charged air is mixed with the uncharged air and then into the system. In passing through the agent there will be picked up by the agent a portion of the moisture, oils, or greases or other foreign matter contained in the air of the system, and that portion of the air which passes on through the agent will pick up a part of the agent which will unite with the moisture in the air and render the same anti-freezing by lowering the freezing point of the same. The charged air passing into the system will contact with any obstructions which may be formed therein by freezing moisture or congealed greases and will have a dissolving effect upon the same. This same procedure in action is also true in my device if used on systems of artificial or natural gases, etc.

In the arrangement shown in Fig. 5 the fluid of the system passing along the pipe 20 as indicated by the arrow will divide and part will pass through pipe 21 and part through pipe 22, depending upon the opening of the valve 25 and the fluid passing through the pipe 22 will pass through the device AF and become charged with the agent contained therein and pass out through the pipe 23 and into the pipe 24 and then into the system and render the air therein charged with the agent.

Without limiting myself to details of construction, which may be varied within the scope of the invention, what I claim as new and desire to secure by Letters Patent, is:—

1. The combination with a fluid pressure system of a receptacle having communication with the system, an agent in the receptacle capable of preventing the accumulation of obstructions in the system, and means for forcing the fluid in the system through the agent to charge the fluid with the agent.

2. The combination with a fluid pressure system of a receptacle having communication with the system, an agent which controls formation of obstructions in the system contained in the receptacle, and means for forcing part of the fluid in the system through the agent to charge such fluid with the agent.

3. The combination with a fluid pressure system of a receptacle having communication with the system, an agent which forms with the fluid a mixture tending to control formation of obstructions in the system contained in the receptacle, means for forcing fluid in the system through the agent to form the mixture, and adjusting means for varying the amount of fluid forced through the agent.

4. The combination with a fluid pressure system of a receptacle having communication with the system and containing an agent which forms with moisture or water a mixture tending to control formation of obstructions in the system, means for forcing fluid of the system through the agent and a by-pass and a valve therein for varying the amount of fluid forced through the agent to form the mixture.

5. The combination with a fluid pressure system of a device comprising a chamber having communication with the system, means dividing the chamber into two parts, a receptacle having openings into the chamber, an agent contained in the receptacle capable of forming with the fluid a mixture having a lower freezing point than the fluid, and means for forcing the fluid of the system from one part of the chamber through the agent to form the mixture and then into the other part of the chamber.

6. The combination with a fluid pressure system of a device comprising a chamber having communication with the system, means dividing the chamber into two parts, an opening in the dividing means for permitting fluid to pass from one part of the chamber into the other part, a receptacle having communication with the chamber, an agent contained in the receptacle, means in the receptacle capable of forming with the fluid a mixture tending to control formation of obstructions for forcing fluid of the system from one part of the chamber through the agent to form the mixture and then into the other part of the chamber.

7. The combination with a fluid pressure system of a chamber having communication with the system, means dividing the chamber into two parts, an adjustable opening in the dividing means through which fluid passes from one of the parts of the chamber into the other part, a receptacle having communication with the chamber, an agent contained in the receptacle and which forms with the fluid a mixture capable of controlling formation of obstructions and means in the receptacle for forcing fluid of the system from one part of the chamber through the agent to form the mixture and then into the other part of the chamber.

8. The combination with a fluid pressure system of a device comprising a chamber having communication with the system, means dividing the chamber into parts, a receptacle having communication with the system, an agent in the receptacle and which forms with moisture or water a mixture tending to control formation of obstructions, and means for forcing fluid of the system through the agent to form the mixture.

9. The combination with a fluid pressure system of a chamber having communication with the system, means dividing the chamber into parts, a receptacle, an agent contained in the receptacle and which forms with moisture or water a mixture tending to control formation of obstructions, a partition between the chamber and the receptacle, means in the receptacle dividing it into parts, openings in the partition offering communication between the chamber part and the receptacle part.

10. The combination with a fluid pressure system of a receptacle having communication with the system, an agent contained in the receptacle and which forms with moisture or water a mixture tending to control formation of obstructions, means for inserting the agent in the receptacle, means for forcing fluid through the agent to form the mixture and means secured to the receptacle for withdrawing the agent from the receptacle.

11. The method of preventing or removing the formation of obstructions in fluid pressure systems consisting in passing the fluid of the system through an agent which forms with the fluid a mixture capable of controlling formation of obstructions.

12. The method of preventing or removing the formation of obstructions in fluid pressure systems consisting in passing a portion of the fluid of the system through an agent which forms with the fluid passing therethrough a mixture tending to control formation of obstructions.

13. The method of preventing or removing ice or frost in fluid pressure systems consisting in charging the fluid of the system with an agent having a lower freezing point than the fluid by passing the fluid of the system through the agent.

14. The method of preventing obstructions in fluid pressure systems in which the fluid is charged with grease or moisture consisting in passing the charged fluid through an agent which forms with the fluid a mixture tending to control formation of obstructions which will pick up the moisture or grease and charge the fluid with the agent to form the mixture.

15. The method of preventing the formation of obstructions in fluid pressure systems in which the fluid is charged with moisture or greases consisting in passing the charged fluid through an agent which will take up the moisture or grease and which forms with moisture a mixture capable of controlling formation of obstructions.

16. The combination with a compressed air system provided with an air compressor and a pressure tank or receiver of a device positioned in the system between the compressor and the pressure tank and containing an agent which forms with moisture or water a mixture for the purpose described.

17. The combination with a fluid pressure system of a receptacle having communication with the system, an agent in the receptacle capable of reducing accumulated obstructions in the system and means for forcing the fluid of the system through the agent to charge the fluid with the agent.

In testimony whereof I affix my signature.

WALTER W. HUNZICKER.